United States Patent [19]
Haro

[11] Patent Number: 5,283,916
[45] Date of Patent: Feb. 8, 1994

[54] PROCESS FOR TRANSPORTING INJURED OR STRANDED PEOPLE, AND PROTECTIVE CAPSULE FOR CARRYING OUT THE PROCESS

[76] Inventor: Jurgen Haro, Warteweg 7 + 46, Stadtoldendorf 3457, Fed. Rep. of Germany

[21] Appl. No.: 793,362
[22] PCT Filed: Apr. 22, 1991
[86] PCT No.: PCT/DE91/00330
   § 371 Date: Dec. 23, 1991
   § 102(e) Date: Dec. 23, 1991
[87] PCT Pub. No.: WO91/16026
   PCT Pub. Date: Oct. 31, 1991

[30] Foreign Application Priority Data
Apr. 23, 1990 [DE] Fed. Rep. of Germany ....... 4012922

[51] Int. Cl.⁵ .......................... A61G 1/00; B63C 9/04
[52] U.S. Cl. ............................... 5/81.1; 5/626; 441/83; 441/87; 441/40; 441/129; 244/118.5
[58] Field of Search .................. 5/81.1, 625-628; 441/129, 83, 87, 38, 40; 244/118.5

[56] References Cited

U.S. PATENT DOCUMENTS

| | | | |
|---|---|---|---|
| 2,970,324 | 2/1961 | Phillips | 441/38 |
| 3,343,189 | 9/1967 | Pollard et al. | 441/83 |
| 4,533,333 | 8/1985 | Andrew et al. | 441/38 |
| 4,736,474 | 4/1988 | Moran et al. | 5/449 |
| 4,766,918 | 8/1988 | Odekirk | 441/129 |
| 4,883,301 | 4/1989 | Pugh | 441/83 |

FOREIGN PATENT DOCUMENTS

| | | |
|---|---|---|
| 0087734 | 2/1983 | European Pat. Off. |
| 2532907 | 9/1982 | France |
| 8604312 | 1/1986 | World Int. Prop. O. |

Primary Examiner—Alexander Grosz
Attorney, Agent, or Firm—Irell & Manella

[57] ABSTRACT

The invention concerns a new concept for the transportation of injured or stranded people and a new rescue capsule suitable for this purpose. The process involves the following stages. A capsule which can be closed on all sides, and which has an inflatable floor designed to form at least one bearing surface or litter for an injured person, and a roof and walls is first erected. One or more injured persons are placed in the capsule and installed in the litters. The injured person is secured in the capsule and then the capsule is carried away, together with the injured person, using a suspension fixture attached to the capsule.

25 Claims, 3 Drawing Sheets

PROCESS FOR TRANSPORTING INJURED OR STRANDED PEOPLE, AND PROTECTIVE CAPSULE FOR CARRYING OUT THE PROCESS

FIELD OF THE INVENTION

The present invention relates to a method for the transport of injured or helpless people on land, in particular to the rapid transport of a large number of injured. The invention further relates to a rescue capsule for carrying out the method.

BACKGROUND OF THE INVENTION

Injured people are normally transported to a medical facility, usually a hospital, with the assistance of an ambulance or a helicopter, the people being laid on a stretcher and transported with the stretcher in the vehicle in question. This method of transportation, which is tried and tested in many cases, has however considerable disadvantages in some cases. The recovery of an injured person from an inaccessible terrain, for example a person in difficulty while climbing, can often not be effected or can only be effected with difficulty, since the injured person often must first be brought to a location at which a helicopter can land or to which an ambulance can travel. The often-necessary rapid recovery of an injured person with the assistance of a helicopter is, in particular, made impossible in poor weather conditions, since the helicopter cannot land, for example, during thick fog. The known method, furthermore, reaches practical limits in catastrophic events, in which a large number of people must be cared for and transported, so that the removal of the injured requires too much time, since as a rule it is difficult to collect a number of ambulances at a location within a short time, in order to prepare the stretchers required, which are also needed when an evacuation by helicopter is to occur. As a result of a long length of stay at the location of an accident by persons who, in some circumstances, are badly injured, their chance of survival is sometimes decisively reduced.

SUMMARY OF THE INVENTION

According to the invention, there is provided a method for transporting injured or helpless people, in particular for the rapid transport of a large number of injured, comprising the following steps: erecting a capsule provided with an inflatable floor, a roof, a wall structure and a suspension device to form at least one completely enclosed litter; placing at least one injured person in the capsule and installing the person on the litter, securing the injured person in the capsule; and carrying away the capsule containing the injured person using said suspension device located on the capsule.

The method according to the invention is based on the use of closed rescue capsules in which the injured can be laid, the capsules being formed so that the installation can be effected directly on the inflatable floor of the capsule. The evacuation of the injured person or persons takes place together with the transportation of the capsule, for example beneath a helicopter. An awkward loading of the injured into the helicopter can thus be avoided. The evacuation is also possible—if necessary by means of a relatively long line—when the helicopter cannot land due to poor visibility, since the picking up of the capsule is not dependent upon the landing of the helicopter. The connection to a preferably automatic suspension device on the rescue capsule can be effected without difficulty over a length of 20 to 30 meters. For the transportation, the capsule is drawn, by means of a winch provided on the helicopter, to a suitable distance from the helicopter.

The method according to the invention brings with it a number of advantages. The rescue capsules used can be kept in storage in comparatively small spaces in rigid containers and if required at locations at which a large number of people congregate, for example in football stadiums, at car racing tracks, air shows etc. as a precautionary measure. Furthermore, if necessary the rescue capsules can be ejected in rigid containers from helicopters, so that in the case of a catastrophe with a large number of injured people, a large number of rescue capsules can rapidly be brought and the injured can be laid in the capsules by helpers. Since the rescue capsules can also each accommodate a number of injured, for example two or four, the removal of the injured can take place very rapidly. The injured then remain in the capsule and can if required be treated within the capsule by a doctor. During the transportation, the injured are located in a completely sterile environment in the capsule and do not need to be repeatedly transferred. The internal equipment of such a rescue capsule can be prepared for the most varied uses, in order to be able, for example, to undertake transfusions, resuscitations, etc. It is also conceivable to specially equip rescue capsules for different uses, for example for burns, resuscitations and the like, so that the doctor providing initial treatment has available the best equipment and can undertake the appropriate treatment during the transportation of the rescue capsule.

Gentle transportation of the injured in the rescue capsule is possible since the inflated floor ensures a good springing and the injured can be supported in a suitable manner by special air cushioning and can be secured by belts and hook-and-loop fasteners or the like.

It is of course possible to transport the rescue capsule in a manner other than by helicopter, for example by a land vehicle or by a different aircraft.

According to another aspect of the invention, there is provided a rescue capsule, comprising an inflatable floor, provided with raised edge portions, forming at least one litter, to which retainers for securing at least one injured person are fixed, a roof and wall structure with support elements supported on the floor, which together with the floor form the closed capsule and in which at least one closable opening is provided and a suspension device provided on the capsule for transporting the capsule.

The raised edge portions of the floor are preferably formed by a circumferential tube, the diameter of which far exceeds the height of the floor. The floor can advantageously have a rectangular shape, a rectangular rounded shape being provided with sloping corners in order to retain a substantially rectangular bearing surface for the injured.

The roof and wall structure is preferably arcurately shaped and has at the middle a highest point, at which the holder for the capsule can be located. The support elements for the roof and wall structure can likewise be inflatable, but can also be formed by bendable resilient rods, belts or the like.

The floor can be formed from a plurality of chambers, in order to maintain the inflated condition of the floor as a whole upon damage to a chamber.

The rescue capsule can expediently be provided with an automatic inflator for automatic inflation of all inflatable parts after actuation of a release mechanism. The thusinflated parts are those which are responsible for the stability of the capsule.

The floor preferably has built-in litters with selectively inflatable support wedges for the adjustment of different inclinations of the upper body and, if required, the lower body of the injured. The selectively inflatable support wedges are expediently inflated by a fixedly built-in hand pump mechanism. In this way, a expert support of the injured in dependence upon the injury can be ensured.

The rescue capsule preferably has holders for first aid materials and apparatuses, special measures—as already mentioned—for particular catastrophic events being possible.

The walls of the rescue capsule are preferably covered with insulating material.

In order to prevent a bulging of the inflated floor, which could impair a stable support of the injured person or persons, the inflatable floor can comprise two parallel plies and spacer webbing arranged therebetween. The spacer webbing, vulcanized in the two parallel plies, ensures that the two plies are held substantially parallel to one another so that a relative bulging of the floor is prevented.

The opening of the capsule, by which the injured can be brought into the interior, can expediently be effected by hook-and-loop fasteners, sliding clasp fasteners or the like.

In a particularly preferred embodiment of the rescue capsule according to the invention, the raised edge portion of the floor has a first tube which assures stability and a further tube of greater diameter, which is inflated with only a low pressure and which, under the weight of the rescue capsule, can be compressed or pressed sideways. With such a second tube, which preferably surrounds the first tube downwardly and laterally outwardly, and thus forms together with the first tube a double tube arrangement, an effective shock absorbing system can be realized, which enables the rescue capsule to be deposited, even roughly, by the helicopter on land and to prevent endangering the injured being carried, even when the rescue capsule must be jettisoned into free fall from a low height (up to 3 m).

For reasons of stability, it may be expedient to form the raised peripheral part with two tubes of substantially the same diameter, arranged one over the other and ensuring the stability, which are connected to one another and of which the upper tube carries the roof and wall structure and the lower tube carries the floor.

The shock absorption realized with the tube inflated at only a low pressure can be further improved if, beneath the floor and the second tube, there is formed a pressure-free chamber with a flexible wall, which is provided with a plurality of air outlet openings which allow rapid escape, under the weight of the rescue capsule, of the air enclosed in the chamber. The pressure-free chamber should thus, on deposition of the rescue capsule, be compressible in the shortest time so that the rescue capsule can be set down stably on the tubes providing the stability. By the escape of the air through the air outlet openings of the pressure-free chamber, a certain additional shock absorption is achieved.

The flexible wall of the pressure-free chamber is preferably formed convexly curved. This form of the wall can be achieved, and maintained during the transportation of the rescue capsule, by a weighting of the wall or by appropriate reinforcement inserts.

The construction of the rescue capsule with tubes inflated at higher pressure and providing stability, and at least one shock-absorbing tube, which is inflated with a lower pressure, enables a simple construction, an automatic inflation of the rescue capsule and a safe transportation of the injured, even in the case that the rescue capsule is transported in suspension beneath a helicopter.

BRIEF DESCRIPTION OF THE DRAWINGS

An embodiment of the invention is illustrated by way of example in the accompanying drawings, in which.

DETAILED DESCRIPTION OF THE PREFERRED EMBODIMENT

Figure 1:
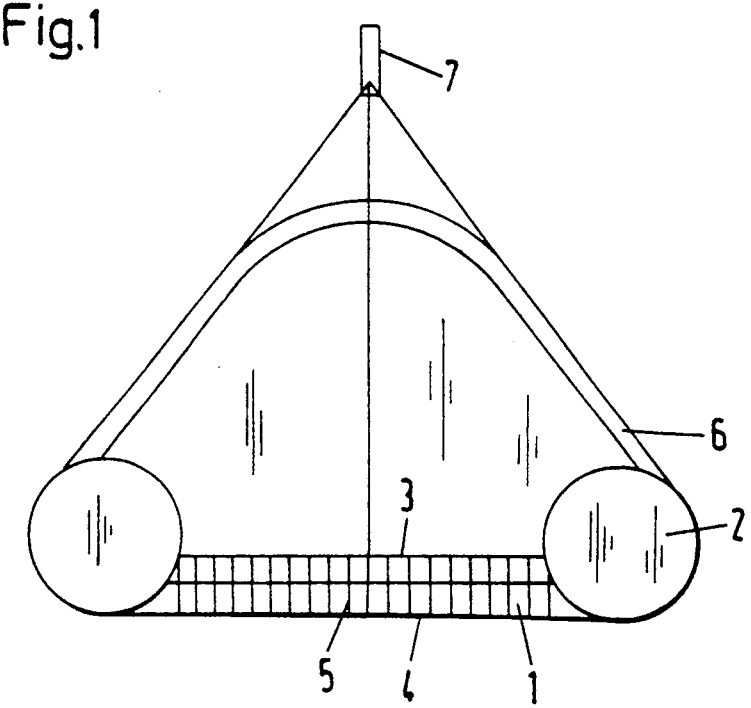
FIG. 1 shows a vertical section through a closed rescue capsule.

FIG. 1 shows an inflated floor 1 which is surrounded by a circumferentially extending air tube 2 forming a peripheral collar. The floor 1 can comprise a plurality of chambers and is formed of at least two parallel plies 3, 4 which are connected to one another by spacer webbing 5 and are thus held parallel to one another with avoidance of bulges.

The diameter of the circumferentially extending air tube 2 is more than twice as large as the height of the floor 1.

On the circumferentially extending air tube 2 there are supported upwardly arcuately curving air tubes which constitute the support elements 6 for a roof and wall structure. The support elements 6 can be connected by simple wall plies, provided if required with insulating layers.

The support elements 6 bear holder 7 from which the closed capsule can be suspended and transported in a suspended condition.

Figure 2:
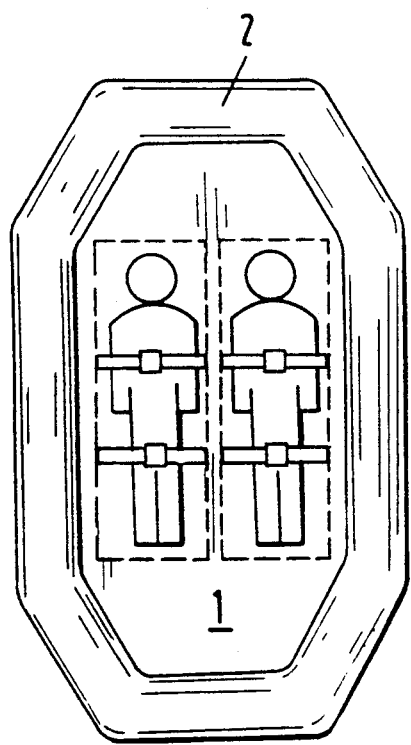
FIG. 2 shows a plan view of the floor of a rescue capsule for two persons.
Figure 3:
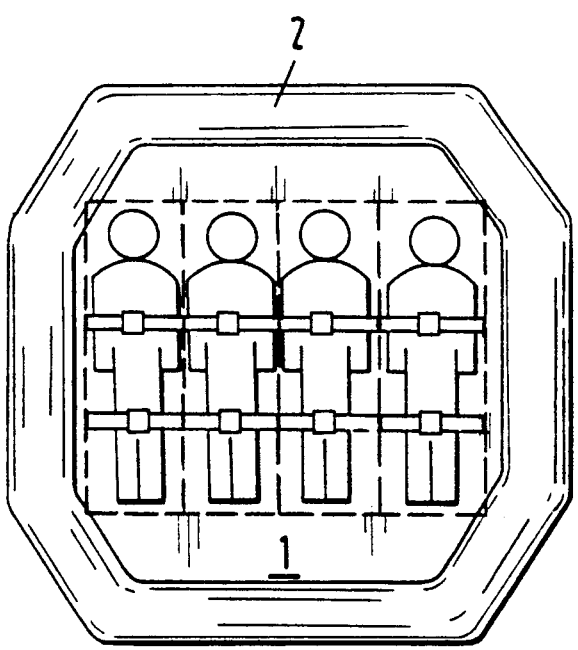
FIG. 3 shows a plan view of the floor of a rescue capsule for four persons.

FIGS. 2 and 3 show plan view of the floor of two embodiments, the floor 1 in FIG. 2 being—as indicated—formed for two persons and the floor 1 according to FIG. 3 being formed for four persons. In both cases, the floor 1 is formed substantially rectangularly, with, however, sloping corners, so that in both cases a substantially hexagonal form of the floor 1 is produced.

Figure 4:
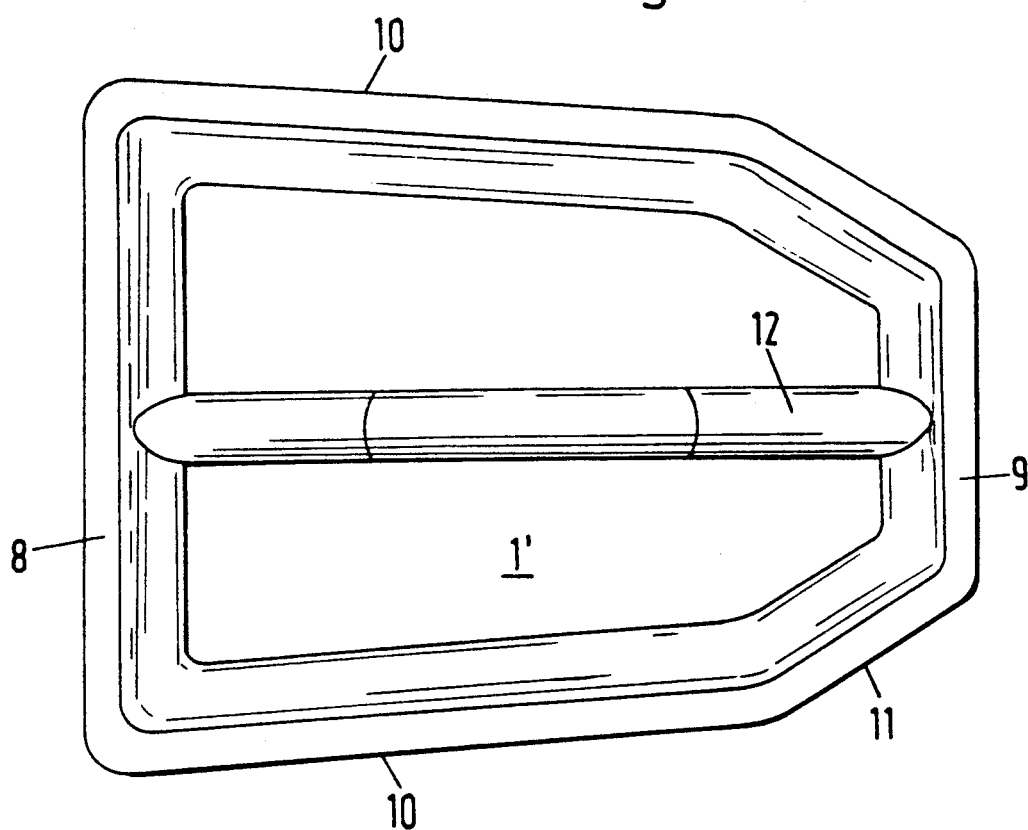
FIG. 4 shows a plan view of another embodiment of the rescue capsule for three persons.
Figure 5:
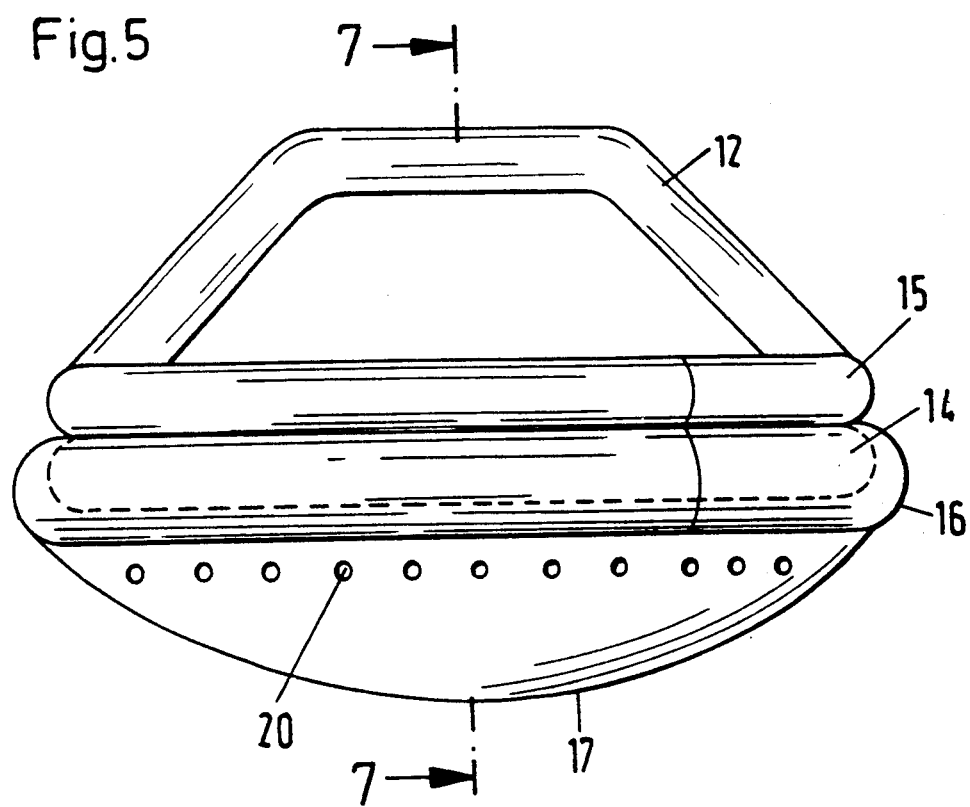
FIG. 5 shows a view in elevation of the longitudinal side of the rescue capsule according to FIG. 4.
Figure 6:
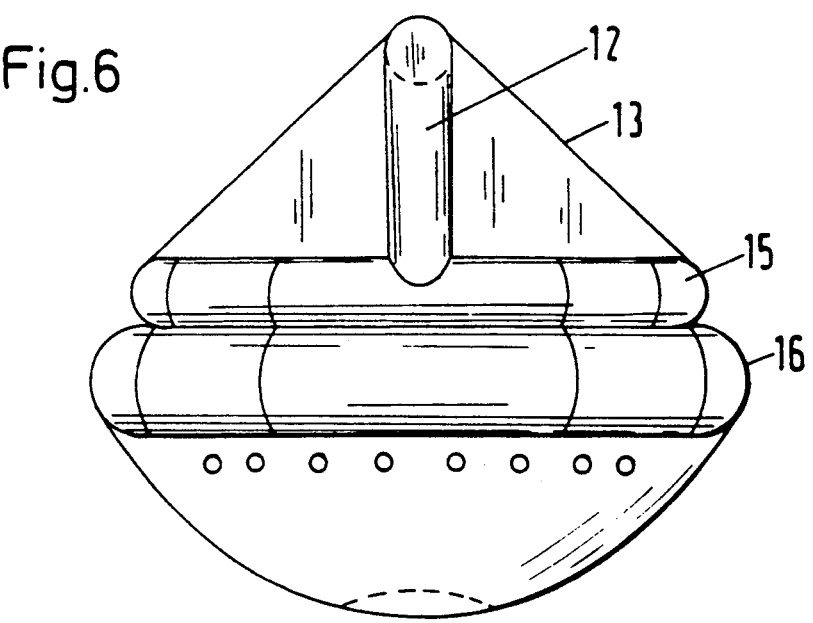
FIG. 6 shows a view in elevation of the narrow end of the rescue capsule according to FIG. 4.

FIG. 4 shows a plan view of another embodiment of the rescue capsule which is suitable for receiving three people. The bottom 1' of this rescue capsule has a long end 8 and a narrow end 9. Two longitudinal sides 10 extend slightly inclined towards one another at first and, shortly before the narrow end 9, form more strongly convergent sections 11 in order to provide the transition to the narrow end 9.

FIGS. 4 to 7 show that an arcuately shaped tube 12 forms the support for the sloping roof walls, which are formed of tarpaulins.

Figure 7:
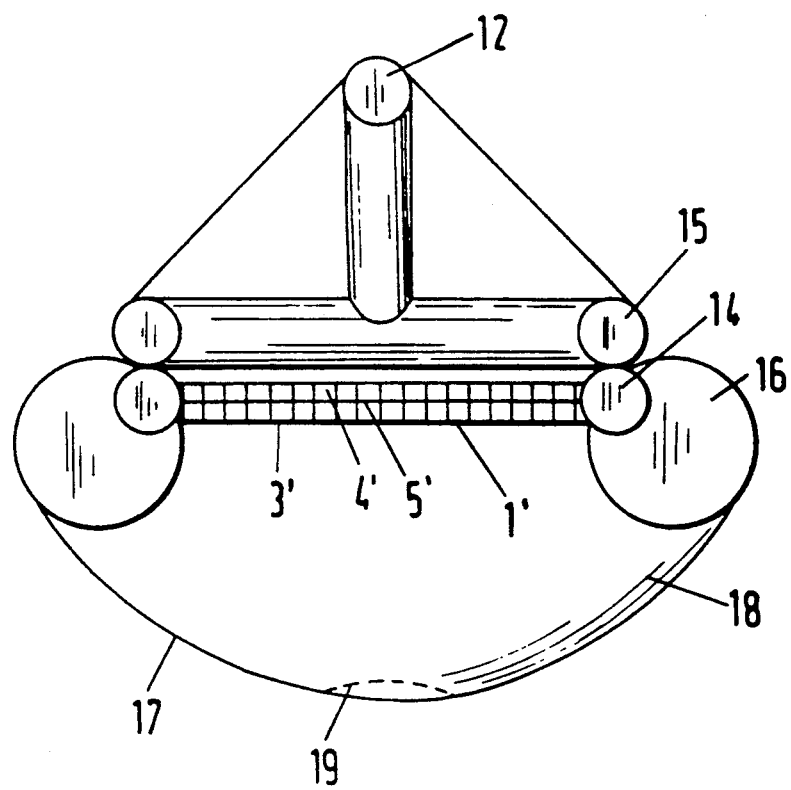
FIG. 7 is a section along the line 7—7 in FIG. 5.

The floor 1' is, in the embodiments illustrated in FIGS. 4 to 7, surrounded by a plurality of aid tubes 14, 15, 16. The floor 1' is—as FIG. 7 shows—formed by two parallel plies 3'4', which are connected together by spacer webbing 5'. The floor is pumped up with a relatively high pressure of 0.5 to 1 bar and is therefore made relatively hard. It is surrounded and retained by a first air tube 14. The air tube 14 has a diameter which is relatively small but which forms a peripheral collar relative to the floor 1'. On this first tube there is fixed a second tube 15, which has the same dimensions and the same cross-section. The second tube 15 is connected to the tube 12 which is formed in a curve. The tubes 12, 14, 15 are pumped up with a relatively high pressure between 0.5 and 1 bar. The first tube 14 is surrounded by a third tube 16 having a substantially greater cross-sectional diameter, the part of the third tube 16 which projects beyond the first tube 14 extending downwardly and radially outwardly of the first tube 14. The third tube 16 has a diameter which is at least twice that of the first tube 14, but is pumped up with only a lower pressure of the order of magnitude of 0.01 to 0.1 bar.

A downwardly convexly curved wall 17, which terminates at the other side of the third tube 16, forms a pressure free chamber 18 with the third tube and the floor 1'. In order to ensure the convex curvature of the wall 17, which due to lack of pressure in the chamber 18 has to be produced only by the weight of the flexible wall 17 or the preforming thereof, and to maintain it during the transportation of the rescue capsule, it may be suitable to provide a weight 19, for example in the form of a lead chain, in the lower middlepoint of the flexible wall 17. Closely beneath the third tube 16, the wall 17 has air outlet openings 20, which enable a rapid escape of the air from the chamber 18. Further air outlet openings for the chamber 18 can be provided in the floor 1'. If these air outlet openings 20 are not sufficient, additional air outlet openings can be provided.

The stability of the rescue capsule illustrated in FIGS. 4 to 7 is produced exclusively by the strongly inflated tubes 14, 15, 12 and the similarly inflated floor 1'.

The third tube 16, which together with the first tube 14 forms a double tube arrangement, serves for shock absorption in case the rescue capsule, hanging from the helicopter, intentionally or unintentionally falls from a small height (max. about 3 m) to the ground. This can happen unintentionally when the helicopter plunges as a result of air turbulence. The third tube 16, with its relatively small pressure, is compressed or bent upwardly by the weight of the rescue capsule, so that the capsule finally comes to rest with the first peripheral tube 14 and the floor 1' on the ground. The third tube 16 thus only has the function of damping an impact of the capsule on the ground.

The shock-absorbing damping of the third tube 16 is further reinforced by the formation of a pressure-free air chamber 18 at the underside of the rescue capsule. The deposition of the capsule on the peripheral first tube 14 and the floor 1' is slightly delayed by the air escaping from the chamber 18 through the air outlet openings 20. Any shape-defining reinforcement provided in the flexible wall 17 must in that case be so formed that it immediately deflects upwardly under the weight of the capsule and enables the flexible wall 17 to lie flat beneath the floor 1' within the briefest time. The air outflow through the air outlet openings 20 must occur so quickly that the capsule is in fact shock-damped on reaching the ground, but not cushioned unstably so that it can tip over.

The rescue capsule formed in accordance with FIGS. 4 to 7 thus allows an effective shock absorption even in the case of a non-vertical arrival of the capsule on the ground. The laterally protruding third tube 16, which is pumped up with only a low pressure, ensures that a lateral impact of the rescue capsule is effectively damped, so that a safe transportation of the injured with the rescue capsule—even in suspension under a helicopter—is possible.

The form of the floor 1' of the rescue capsule apparent from FIG. 4 makes possible the transportation of this capsule in an inflated condition on a truck, if this should be expedient. The shape of the capsule suggests that two people be arranged with their heads to the wide end 8 and one person be laid in the opposite direction on the floor 1'. In each floor region, openings can be provided in the two plies 3', 4' and in the spacer webbing 5' in order to make possible the ventilation of the chamber 18 in the required and, if necessary load-dependent manner. If necessary, ventilation openings must be provided in the walls 13.

It is particularly effective if sick-beds, likewise formed of inflated spaced webbing, are laid on the floor 1'. The shock-damping, effective for the injured, which is produced by the floor 1' is still further improved by the sick-beds. This is particularly the case if, by a deposition of the rescue capsule on a ground from which pointed objects project, the floor 1' should be partially damaged. The sick-beds can be formed so that, when provided in the right number for the particular rescue capsule, they form a complete second floor.

It can be seen that the concept of the closed capsule for the transportation of injured people offers considerable advantages and completely new treatment possibilities.

While the preferred application of the present invention has been shown and described, it should be apparent to those skilled in the art that many more modifications are possible without departing from the invention concept herein described. It is intended to cover in the appended claims all such modifications as fall within the true spirit and scope of the invention.

I claim:

1. A method for transporting injured or helpless people, in particular for the rapid transport of a large number of injured persons, comprising the following steps:
    erecting a capsule provided with an inflatable floor, a roof and wall structure and a suspension device to form a plurality of enclosed litters with retainer means for releasably securing an injured person thereto,
    placing at least one injured person in said capsule and installing said injured person on one of said litters,
    securing said injured person in said capsule, and
    carrying said said capsule containing said injured person using said suspension device.

2. A method as recited in claim 1, wherein a plurality of injured people are transported in said capsule.

3. A method as recited in claim 1 or 2, further comprising the step of supporting said erected capsule at its roof and transporting said capsule in suspension for evacuation.

4. A rescue capsule adapted for use by a plurality of injured persons, comprising:
    an inflatable floor, provided with raised edge portions surrounding its periphery, said inflatable floor comprising a plurality of litters built into said floor, said litters comprising retainers means for releasably securing an injured person thereto, a roof and wall structure with support elements supported on said floor, said roof and said wall structure together with said floor forming a closed capsule in which at least one closable opening is provided, and a suspension device provided on said capsule for transporting said capsule.

5. A rescue capsule as recited in claim 4, wherein said suspension device is located at the upper side of said capsule for transporting said capsule in suspension.

6. A rescue capsule as recited in claim 4 or 5, wherein said raised edge portions of said floor are formed by a peripheral tube, the diameter of which far exceeds the height of said floor.

7. A rescue capsule as recited in claim 4 or 5, wherein said floor has a rectangular shape.

8. A rescue capsule as recited in claim 4 or 5, wherein said roof and wall structure is curved and has an apex at the middle.

9. A rescue capsule as recited in claim 4 or 5, wherein said support elements of said roof and wall structure are inflatable.

10. A rescue capsule as recited in claim 4 or 5, wherein said floor comprises a plurality of chambers.

11. A rescue capsule as recited in claim 4 or 5, further comprising an automatic inflator for automatic inflation of all inflatable parts after actuation of a release mechanism.

12. A rescue capsule as recited in claim 4 or 5, wherein said litter has inflatable support wedges for the adjustment of different inclinations of the upper body and the lower body of the injured person.

13. A rescue capsule as recited in claim 4, further comprising means for holding first aid materials and equipment.

14. A rescue capsule as recited in claim 30 or 31, wherein said walls are covered with an insulation material.

15. A rescue capsule as recited in claim 4 or 5, wherein said inflatable floor comprises two parallel plies and spacer webbing arranged therebetween.

16. A rescue capsule as recited in claim 4 or 5, wherein said capsule is packed in a closed separate container in a collapsed condition before erection.

17. A rescue capsule as recited in claim 4, wherein said raised edge portion of said floor has a first tube providing stability and a further tube of greater diameter, said further tube being inflated to only a low pressure and being completely compressible under the weight of said rescue capsule.

18. A rescue capsule as recited in claim 17, wherein said further tube surrounds said first tube downwardly and laterally outwardly.

19. A rescue capsule as recited in claim 18, wherein a pressure-free chamber with a flexible wall is formed beneath said floor, said chamber being provided with a plurality of air outlet openings which enable a rapid escape of the air enclosed in said chamber under the weight of the rescue capsule.

20. A rescue capsule as recited in claim 19, wherein the wall of said chamber is weighted at the underside thereof by a weight.

21. A rescue capsule as recited in claim 19 or 20, wherein the wall of said chamber has reinforcement inserts maintaining the shape of said chamber erect in a pressure-free condition.

22. A rescue capsule as recited in claim 4, wherein said raised edge portion is formed by two tubes arranged one above the other which provides stability, both of said tubes having substantially the same diameter, said tubes being connected to one another, wherein the upper of said tubes carries said roof wand all structure and the lower of said tubes carries said floor.

23. A rescue capsule as recited in claim 17, 18 or 22, wherein said further tube is inflated with a pressure of 0.05 to 0.1 bar.

24. A rescue capsule as recited in claim 4 or 5, further comprising a tube for providing stability, said tube being is inflated with a pressure of 0.5 to 1 bar.

25. A rescue capsule as recited in claim 4 or 5, in which said floor is inflated with a pressure of 0.5 to 1 bar.

* * * * *

UNITED STATES PATENT AND TRADEMARK OFFICE
CERTIFICATE OF CORRECTION

PATENT NO. : 5,283,916
DATED     : February 8, 1994
INVENTOR(S) : Jurgen Haro

It is certified that error appears in the above-identified patent and that said Letters Patent is hereby corrected as shown below:

Column 3, line 4, cancel "thusinflated" and insert --thus-inflated--

Column 3, line 11, cancel "a" and insert --an--

Column 4, line 47, after "bear" and before "holder" insert --a--

Column 4, line 50, after "show" and before "plan" insert --a--

Column 8, line 34, cancel "wand all" and insert --and wall--

Signed and Sealed this

Nineteenth Day of July, 1994

BRUCE LEHMAN

*Attest:*

*Attesting Officer*    Commissioner of Patents and Trademarks